United States Patent [19]
Kikuchi et al.

[11] Patent Number: 5,526,169
[45] Date of Patent: Jun. 11, 1996

[54] ELECTRO-OPTICAL MODULATOR

[75] Inventors: Hiroki Kikuchi, Kanagawa; Asif A. Godil, Tokyo; Tatsuo Fukui, Kanagawa, all of Japan

[73] Assignee: Sony Corporation, Tokyo, Japan

[21] Appl. No.: 321,921

[22] Filed: Oct. 12, 1994

[30] Foreign Application Priority Data

| Oct. 14, 1993 | [JP] | Japan | 5-257179 |
| Feb. 15, 1994 | [JP] | Japan | 6-018703 |
| Apr. 26, 1994 | [JP] | Japan | 6-088653 |

[51] Int. Cl.$^6$ ................................... G02F 1/03
[52] U.S. Cl. .................. 359/245; 359/246; 359/254
[58] Field of Search ......................... 359/252, 257, 359/264, 276, 245, 246, 254

[56] References Cited

U.S. PATENT DOCUMENTS

| H868 | 1/1991 | Daly | 350/387 |
| 3,446,966 | 5/1969 | Peterson | 250/199 |
| 3,719,414 | 3/1973 | Wentz | 350/150 |
| 4,466,703 | 8/1984 | Nishimoto | 350/379 |
| 5,140,454 | 8/1992 | Shibaguchi | 359/254 |

Primary Examiner—Mark Hellner
Attorney, Agent, or Firm—Hill, Steadman & Simpson

[57] ABSTRACT

An electro-optical modulator has an electro-optical crystal having an optical path, and a pair of electrodes disposed one on each side of the optical path for applying a signal voltage therebetween. At least one of the electrodes is formed on a side surface of a groove defined along the optical path of the electro-optical crystal.

8 Claims, 6 Drawing Sheets

ELECTRO-OPTICAL MODULATOR

BACKGROUND OF THE INVENTION

The present invention relates to an electro-optical modulator suitable for use in optically recording data.

One known laser beam generator for use as a laser beam source for optically recording data comprises a semiconductor laser, a laser medium, and a nonlinear optical device. A laser beam generated by the semiconductor laser is applied to excite the laser beam to emit a laser beam which is introduced as a fundamental into the nonlinear optical device, and a shorter-wavelength laser beam is obtained as a second harmonic from the nonlinear optical device. The laser beam generator has a low power requirement and is capable of producing a high laser beam power density. Use of the laser beam generator as a laser beam source for optically recording data requires an external beam intensity modulator for modulating an output laser beam that is emitted from the laser beam generator. The external beam intensity modulator has to meet the following requirements:

It has to have a wide modulation frequency band;

It must not cause optical damage at a laser beam intensity high enough to optically record data;

The extinction ratio, i.e., the ratio of the minimum to the maximum value of an output laser beam intensity, must be large;

It must have a low drive voltage, i.e., a half-wavelength voltage; and

The loss of an incident laser beam must be small.

Conventional external beam intensity modulators include an acousto-optical modulator and an electro-optical modulator. The acousto-optical modulator has drawbacks in that its modulation frequency band is narrow, i.e., it is of 40 MHz, and it causes a large loss of incident laser beam, i.e., it causes a loss of 30%. Since the electro-optical modulator has a higher modulation rate of 500 MHz or more and a smaller loss of incident laser beam than the acousto-optical modulator, studies have been directed to efforts to use the electro-optical modulator in applications to optically record data.

One conventional electro-optical modulator will be described below with reference to FIG. 1 of the accompanying drawings. The electro-optical modulator has a pair of electro-optical crystals 1, 2 each of $LiTaO_3$ or $LiNbO_3$. Each of these electro-optical crystals 1, 2 is in the form of a rectangular parallelepiped cut in the directions of "a", "b", and "c" crystal axes. The electrooptical crystal 1 has parallel planes 1a, 1a' confronting each other, parallel planes 1b, 1b' confronting each other and extending perpendicularly to the planes 1a, 1a', and parallel planes 1c, 1c' confronting each other and extending perpendicularly to the planes 1a, 1a' and the planes 1b, 1b'. The parallel planes 1a, 1a' are of a face "a", the parallel planes 1b, 1b' are of a face "b", and the parallel planes 1c, 1c' are of a face "c". Similarly, the electro-optical crystal 2 has parallel planes 2a, 2a' confronting each other, parallel planes 2b, 2b' confronting each other and extending perpendicularly to the planes 2a, 2a', and parallel planes 2c, 2c' confronting each other and extending perpendicularly to the planes 2a, 2a' and the planes 2b, 2b'. The parallel planes 2a, 2a' are of a face "a", the parallel planes 2b, 2b' are of a face "b", and the parallel planes 2c, 2c' are of a face "c".

Each of the electro-optical crystals 1, 2 has a length of 2 mm along the "a" axis, a length of 12 mm along the "b" axis, and a length of 2 mm along the "c" axis. The faces "b" 1b, 1b', 2b, 2b' of the electro-optical crystals 1, 2 are polished to an optical grade, and coated with a nonreflective coating layer which does not reflect a laser beam used. The "c" axes of the electro-optical crystals 1, 2 are tilted 90° with respect to each other for thereby removing natural birefringence and preventing an output laser beam intensity from being varied by temperature fluctuations.

Electrodes 3, 4 are deposited on the entire faces "c" 1c, 1c', 2c, 2c' of the electro-optical crystals 1, 2 by evaporation. A signal source (oscillator) 9 has terminals connected respectively to the electrodes 3 of the electro-optical crystal 1 and also connected respectively to the electrodes 4 of the electro-optical crystal 2 for applying a signal voltage to the electro-optical crystals 1, 2 in the direction of the "c" axis.

A collimated polarized laser beam 7 which has a polarized direction (plane of polarization) at 45° with respect to the "a" and "c" axes of the electro-optical crystal 1 is applied perpendicularly to a central region of the face "b" 1b of the electro-optical crystal 1. The collimated polarized laser beam 7 passes through the electro-optical crystals 1, 2, and is emitted from the face "b" 2b' of the electro-optical crystal 2. The emitted laser beam travels through a polarizer (analyzer) 10 and is applied to a light detector 11. The polarizer 10 is positioned such that its direction of polarization (plane of polarization) extends perpendicularly to the polarized direction (plane of polarization) of the laser beam 7 that is applied to the face "b" 1b of the electro-optical crystal 1. When a signal voltage from the signal source 9 is applied between the electrodes 3, 4 of the electrooptical crystals 1, 2, the refractive indexes of the electro-optical crystals 1, 2, are varied depending on the applied signal voltage, rotating the polarized direction (plane of polarization) of the laser beam 7. Since the laser beam 7 with its polarized direction (plane of polarization) rotated is applied through the polarizer (analyzer) 10 to the light detector 11, the light detector 11 produces a detected signal having a level commensurate with the signal voltage from the signal source 9.

Figure 1:
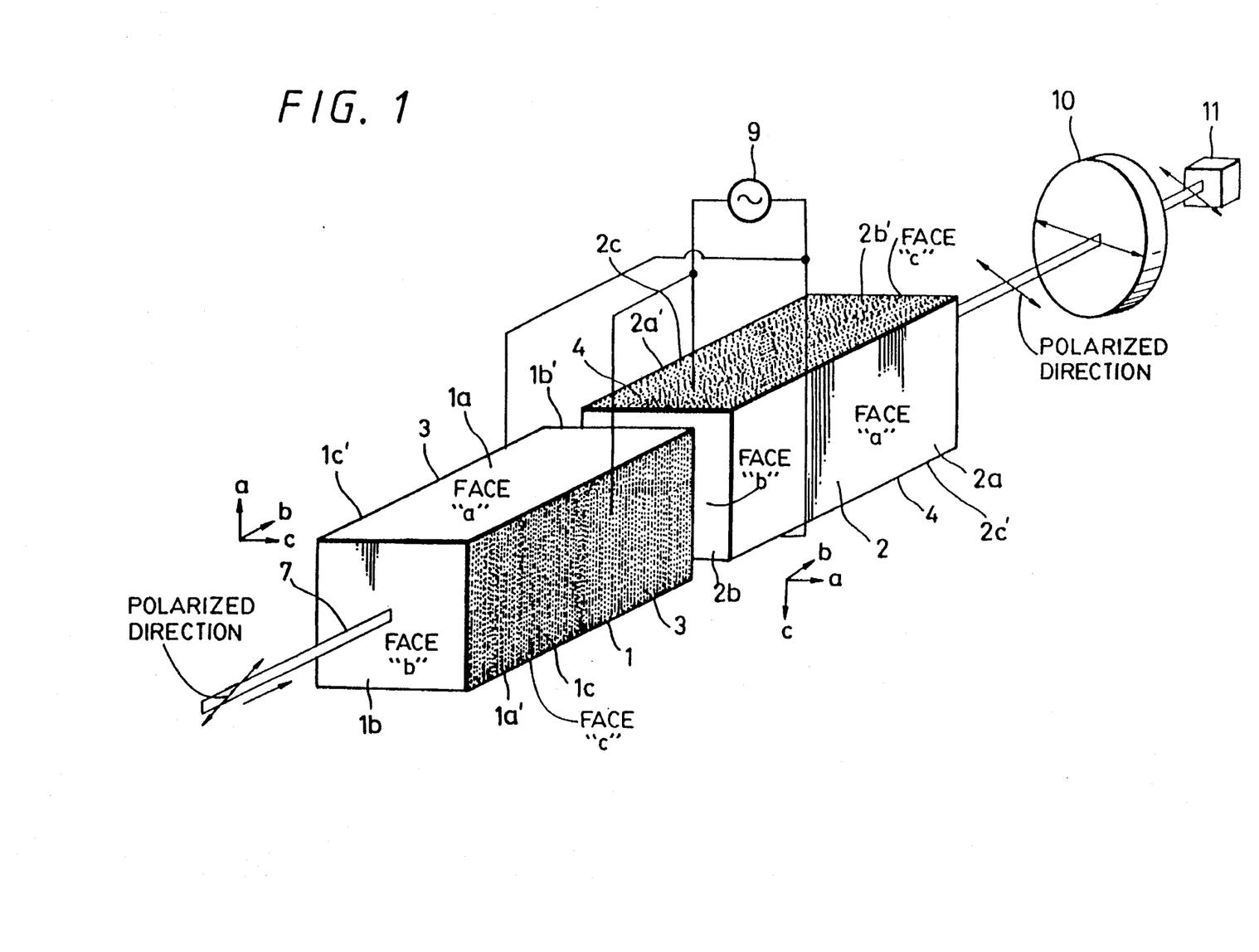
FIG. 1 is a perspective view of a conventional electro-optical modulator.

The conventional electro-optical modulator shown in FIG. 1 suffers the following problems:

(1) The conventional electro-optical modulator has a large halfwave voltage. The halfwave voltage is inversely proportional to the distance between the electrodes on the electro-optical crystals. In order to reduce the halfwave voltage, it is necessary to employ a very slender, long crystal. However, it is difficult to produce such a crystal according to the ordinary grinding process. It is difficult to reduce the halfwave voltage of the conventional electro-optical modulator shown in FIG. 1 to 100V or lower.

The halfwave voltage is a voltage applied to an electro-optical modulator to vary the optical phase difference between two orthogonal linearly polarized components by $\pi$ (rad.) due to an electro-optical effect. Inasmuch as the laser beam intensity can be modulated by a modulation degree of 100% with the halfwave voltage, the halfwave voltage is used as one of indications of the quality of the electro-optical modulator and the optically modulating material. Because the halfwave voltage depends upon the configuration of the device, it is indicated as being standardized by its value at the time the optical path length and the interelectrode distance are equal to each other so that the halfwave voltage is used as an indication of the quality of the optically modulating material without being affected by the configuration of the device. For phase modulation, the definition of the halfwave voltage may be stretched to mean an applied voltage to given a phase change of $\pi$ (rad.) to a polarized component in question. The above explanation of the term "halfwave voltage" is in accord with "Dictionary of Optical Terms" published Nov. 30, 1981 by Ohm Co., Ltd.

(2) The conventional electro-optical modulator tends to cause optical damage. In order to obtain a high extinction ratio, it is necessary to reduce the beam diameter of a laser beam in an electro-optical crystal. If the beam diameter of a laser beam in an electro-optical crystal is reduced, then the optical density in the electro-optical crystal is increased. If the electro-optical crystal is made of $LiTaO_3$ or $LiNbO_3$, then when a laser beam of a reduced diameter which is intensive enough to optically record data, the optical density exceeds an optical damage threshold, and hence causes optical damage to the electro-optical crystal, which is thus unable to be used as the electro-optical modulator.

Generally, the optical damage is a phenomenon in which a solid body is damaged by the application of an intensive laser beam. Specifically, a solid body is irreversibly damaged on its surface or in its internal structure by a temperature rise, a plasma generation, a self convergence, or a stimulated Brillouin effect. In a narrower sense, the optical damage also signifies a reversible phenomenon in which a carrier excited by light is moved in $LiNbO_3$ or the like and caught by a trap, generating an internal electric field which causes a refractive index to be locally varied by an electro-optical effect. The above definition of the optical damage is given by the dictionary referred to above.

(3) The extinction ratio of the conventional electro-optical modulator is poor. The extinction ratio is degraded if the beam diameter of a laser beam applied to an electro-optical crystal is increased to increase the optical density.

The extinction ratio is the ratio Imin/Imax (or its reciprocal) of the minimum value Imin to the maximum value Imax which the intensity of output light can take in the intensity modulation of a light wave, and represents one of indications of the quality of an optical modulator. The extinction ratio is important particularly in the field of digital modulation. Reduction of a code transmission error rate requires a small extinction ratio. This definition of the term is also given by the dictionary referred to above.

SUMMARY OF THE INVENTION

It is therefore an object of the present invention to provide an electro-optical modulator having a low halfwave voltage.

Another object of the present invention is to provide an electro-optical modulator which has low halfwave voltage, is highly durable against optical damage, and has an improved extinction ratio.

According to the present invention, there is provided an electro-optical modulator comprising an electro-optical crystal having an optical path, and a pair of electrodes disposed one on each side of the optical path for applying a signal voltage therebetween, at least one of the electrodes being formed on a side surface of a groove defined along the optical path of the electro-optical crystal. The electro-optical crystal may comprise a pair of electro-optical crystals in which the electrodes are disposed along the optical path such that planes of the electrodes lie perpendicularly to each other.

According to the present invention, there is also provided an electro-optical modulator comprising an electro-optical crystal having a pair of optical paths, a pair of electrodes disposed one on each side of each of the optical paths for applying a signal voltage therebetween, at least one of the electrodes being formed on a side surface of a groove defined along the optical paths of the electro-optical crystal, and a coupling optical element disposed on an end surface of the electro-optical crystal and connecting the optical paths to each other. The coupling optical element may comprise an optical element for giving an optical phase difference of a half wavelength to switch ordinary and extraordinary rays. The coupling optical element may comprise a reflecting prism or a pair of mirrors. Alternatively, the coupling optical element may comprise a reflecting prism and a wave plate disposed between the electro-optical crystal and the reflecting prism. Alternatively, the coupling optical element may comprise a reflecting prism for keeping applied and emitted radiations unchanged in their polarized condition and keeping the applied and emitted radiations in phase with each other, and a quarter-wave plate disposed between the electro-optical crystal and the reflecting prism.

The electro-optical crystal may be $KTiOPO_4$ or other nonlinear crystals which have similar crystal structure to $KTiOPO_4$ (ex. $KTiOAsO_4$, $RbTiOPO_4$, $RbTiOAsO_4$, $CsTiOAsO_4$).

DETAILED DESCRIPTION OF THE PREFERRED EMBODIMENTS

Figure 2:
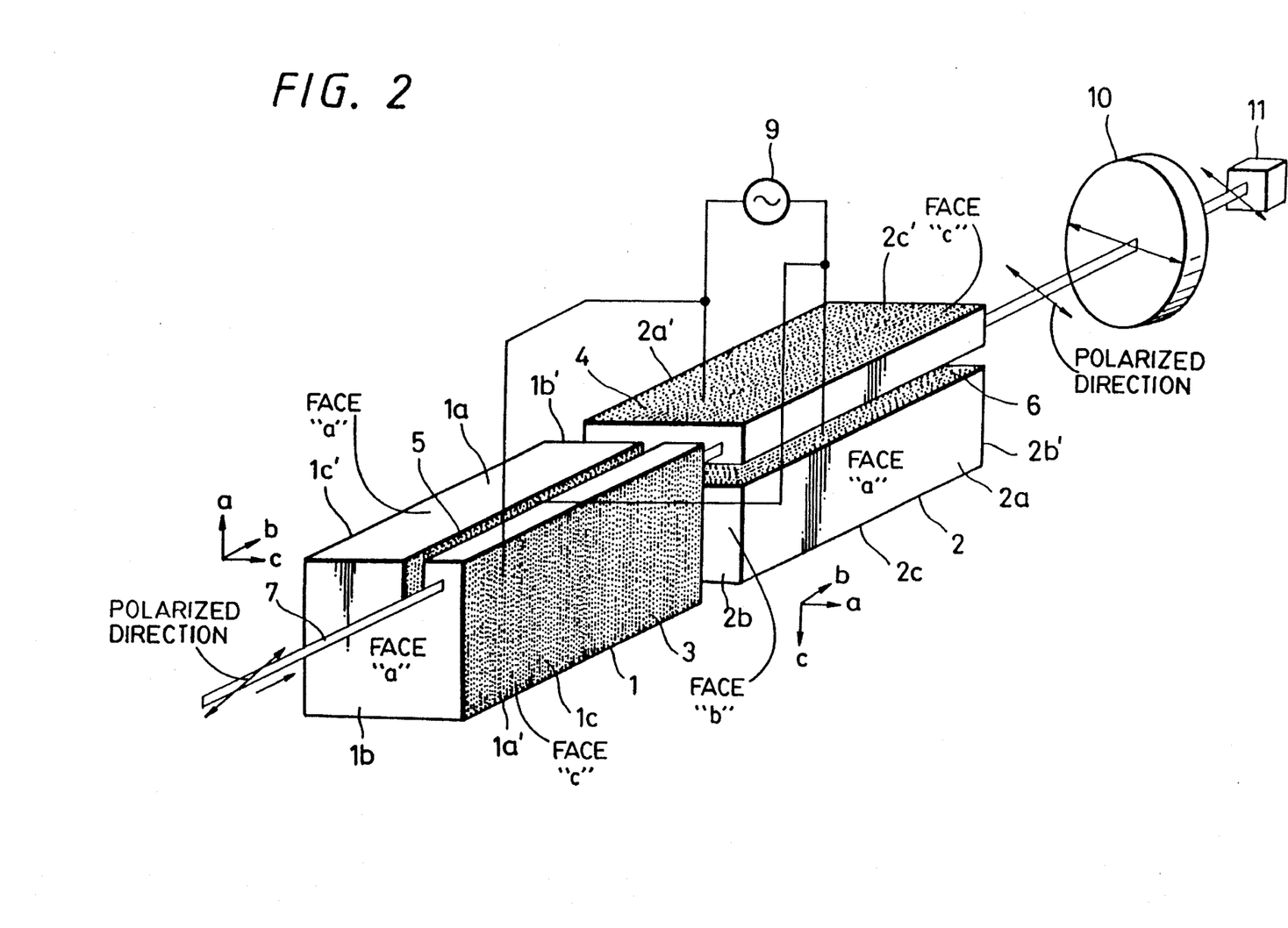
FIG. 2 is a perspective view of an electro-optical modulator according to an embodiment of the present invention.
Figure 3:
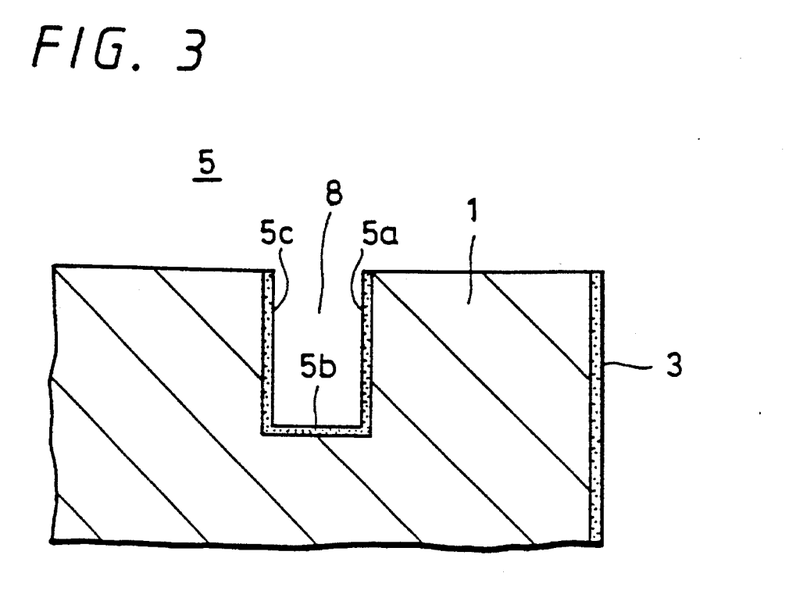
FIG. 3 is a fragmentary transverse crosssectional view of a KTP crystal of the electro-optical modulator shown in FIG. 2.

FIGS. 2 and 3 show an electro-optical modulator according to an embodiment of the present invention.

As shown in FIG. 2, the electro-optical modulator has a pair of electro-optical crystals 1, 2 each of KTP ($KTiOPO_4$). Other nonlinear crystals which has similar crystal structure to KTP (ex. KTA=$KTiOAsO_4$, RTP =$RbTiOPO_4$, RTA= $RbTiOAsO_4$, CTA=$CsTiOAsO_4$) can be applied. These crystals show equivalent advantages to KTP. These advantages will be mentioned later (Page 28). Each of the electro-optical crystals 1, 2 may be made of $LiTaO_3$, though they do not show these advantages. Here in this specification, KTP is referred to as an example. However, each of the electro-optical crystals 1, 2 may be made of $LiTaO_3$ or $LiNbO_3$. Each of these KTP crystals 1, 2 is in the form of a rectangular parallelepiped cut in the directions of "a", "b", and "c" crystal axes. The KTP crystal 1 has parallel planes 1a, 1a' confronting each other, parallel planes 1b, 1b' confronting each other and extending perpendicularly to the planes 1a, 1a' and parallel planes 1c, 1c' confronting each other and extending perpendicularly to the planes 1a, 1a' and the planes 1b, 1b'. The parallel planes 1a, 1a' are of a face "a", the parallel planes 1b, 1b' are of a face "b", and the parallel planes 1c, 1c' are of a face "c". Similarly, the KTP crystal 2 has parallel planes 2a, 2a' confronting each other, parallel planes 2b, 2b' confronting each other and extending perpendicularly to the planes 2a, 2a', and parallel planes 2c, 2c' confronting each other and extending perpendicularly to the planes 2a, 2a40 and the planes 2b, 2b'. The parallel planes 2a, 2a' are of a face "a", the parallel planes 2b, 2b' are of a face "b", and the parallel planes 2c, 2c' are of a face "c".

Each of the KTP crystals 1, 2 has a length of 2 mm along the "a" axis, a length of 12 mm along the "b" axis, and a length of 2 mm along the "c" axis. The faces "b" 1b, 1b', 2b, 2b' of the electro-optical crystals 1, 2 are ground to an optical grade, and coated with a nonreflective coating layer which does not reflect a laser beam used. The "c" axes of the electro-optical crystals 1, 2 are tilted 90° with respect to each other for thereby removing natural birefringence and preventing an output laser beam intensity from being varied by temperature fluctuations.

Electrodes 3, 4 are deposited on the entire faces "c" 1c, 2c' of the electro-optical crystals 1, 2 by evaporation. As shown in FIG. 3, a groove 8 is defined in the face "a" 1a of the electro-optical crystal 1 at a position spaced about 0.4 mm from a ridge where the face "a" 1a and the face "c" 1c intersect with each other, the groove 8 being in the shape of a rectangular parallelepiped having a width of 0.3 mm and a depth of 0.5 mm, for example, and having two side surfaces parallel to the face "c" 1c and a bottom surface parallel to the face "a" 1a. The groove 8 is formed by cutting the electro-optical crystal 1 at a position horizontally spaced about 0.4 mm from a ridge where the face "c" 1a and the face "c" 1c intersect with each other and vertically spaced 1.5 mm from the bottom (face "a" 1a') of the crystal 1, with a dicing saw having a thickness of 0.3 mm. A groove which is identical to the groove 8 is also defined in the electro-optical crystal 2.

A groove electrode 5 is then formed on the side and bottom surfaces of the groove 8 by evaporation. The groove electrode 5 is of an integral unitary structure composed of electrode members 5a, 5c parallel to the two side surfaces of the groove 8 and an electrode member 5b parallel to the bottom surface of the groove 8. The most important of these electrode members 5a, 5c, 5b is the electrode member 5a which confronts the electrode 3 through a portion of the crystal 1, and the other electrode members 5c, 5b may be dispensed with. A groove electrode 6 which is identical to the groove electrode 5 is also formed in the crystal 2.

The electrodes 3, 4 and the groove electrodes 5, 6 deposited on the crystals 1, 2 are in plane symmetry with respect to the "c" axis of the crystals 1, 2. Stated otherwise, the direction extending from the groove electrode 5 toward the electrode 3 on the crystal 1 is the same as the direction of the "c" axis thereof, and the direction extending from the groove electrode 6 toward the electrode 4 on the crystal 2 is opposite to the direction of the "c" axis thereof.

A signal source (oscillator) 9 has a terminal connected to the electrodes 3, 4 of the crystals 1, 2 and a terminal connected to the groove electrodes 5, 6 of the crystals 1, 2 for applying a signal voltage to columnar portions having a size of 0.4 mm×0.4 mm×12 mm (the depth of the groove 8 is actually 0.5 mm, which is slightly greater than the dimension of 0.4 mm) in the direction of the "c" axis, the columnar portions serving as optical paths. The intensity of the electric fields between the electrodes 3, 4 and 5, 6 of the crystals 1, 2 is very high to greatly reduce the halfwave voltage because the interelectrode distance is considerably smaller than that of the conventional structure wherein the electrodes are disposed on the faces "c" of the crystals 1, 2. If the interelectrode distance is 0.4 mm, then the halfwave voltage is 50 V when the wavelength of an applied laser beam is 532 nm.

A polarized laser beam 7 which is collimated to a beam diameter of 80 μm and has a polarized direction (plane of polarization) at 45° with respect to the "a" and "c" axes of the crystal 1 is applied perpendicularly to a corner region of the face "b" 1b of the crystal 1. The collimated polarized laser beam 7 passes through the crystals 1, 2, and is emitted from the face "b" 2b' of the crystal 2. The emitted laser beam travels through a polarizer (analyzer) 10 and is applied to a light detector 11.

The polarizer 10 is positioned such that its direction of polarization (plane of polarization) extends perpendicularly to the polarized direction (plane of polarization) of the laser beam 7 that is applied to the face "b" 1b of the crystal 1. When no voltage is applied between the electrodes 3, 4 and 5, 6 of the crystals 1, 2, no laser beam is detected by the light detector 11. When a signal voltage from the signal source 9 is applied between the electrodes 3, 4 and 5, 6 of the crystals 1, 2, the refractive indexes of the electro-optical crystals 1, 2, are varied depending on the applied signal voltage, rotating the polarized direction (plane of polarization) of the laser beam 7. Since the laser beam 7 with its polarized direction (plane of polarization) rotated is applied through the polarizer (analyzer) 10 to the light detector 11, the light detector 11 produces a detected signal having a level commensurate with the signal voltage from the signal source 9. The electro-optical modulator according to the present embodiment is capable of optical modulation at a high rate of 3.4 nsec.

A process of manufacturing the electro-optical modulator according to the present embodiment will be described below with reference to FIG. 4. A KTP crystal 1 is fixed to a holder 12 such that one of its faces "a" and one of its faces "c" are exposed with the other faces masked. A resist layer 13 is deposited as a mask on the KTP crystal 1 except for areas where a groove 8 is to be defined. Thereafter, a titanium layer having a thickness of 20 nm is deposited on the exposed surface of the KTP crystal 1 by vacuum evaporation, and then a gold layer having a thickness of 500 nm is deposited on the titanium layer, thereby forming an electrode 3 and a groove electrode 5. Thereafter, the resist layer 13 is removed by a solvent. In this manner, the electrode 3 and the groove electrode 5 are formed simultaneously on the KTP crystal 1. Another KTP crystal 2 is fabricated in the same manner as the KTP crystal 1.

Figure 5:
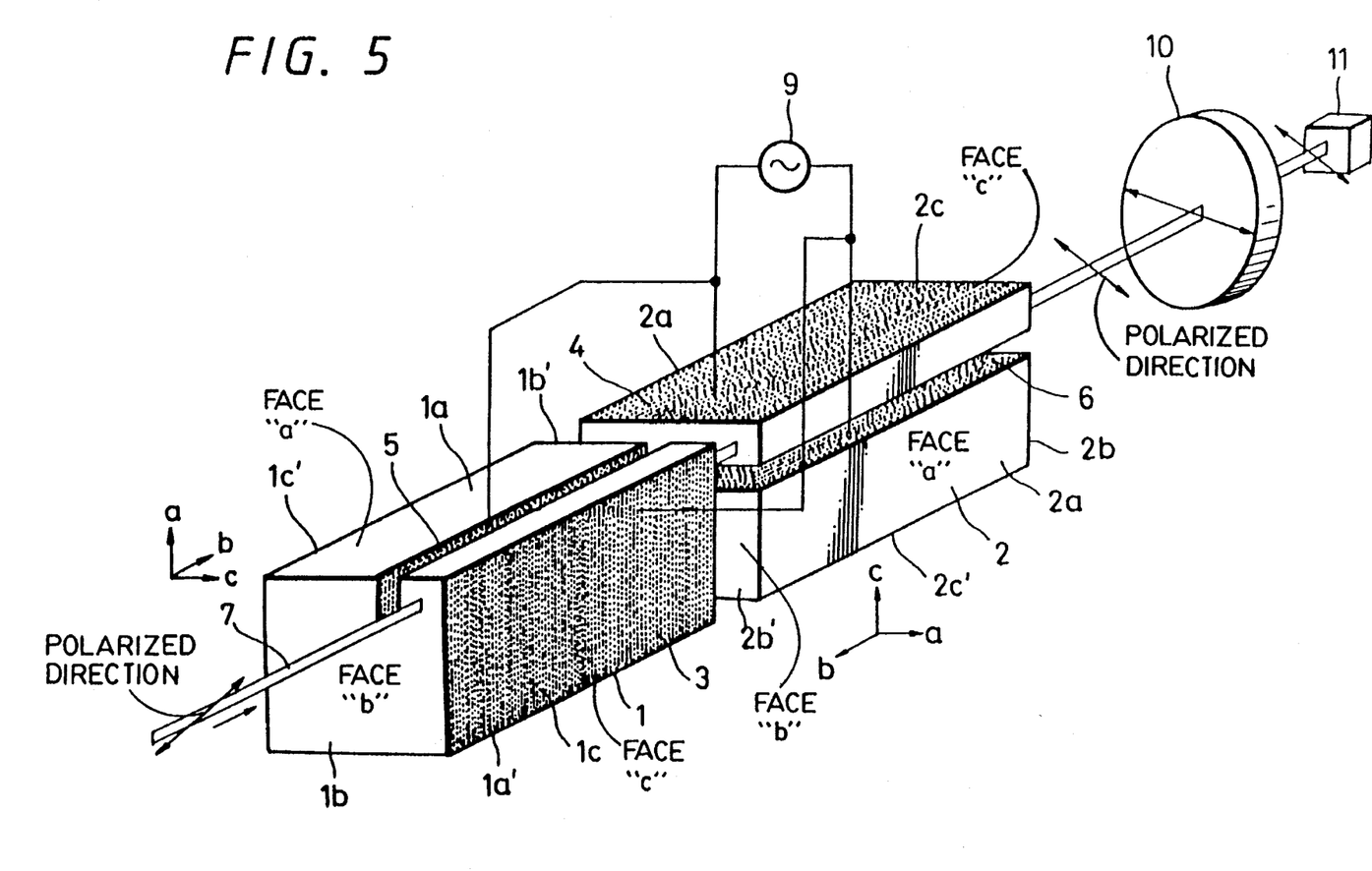
FIG. 5 is a perspective view of an electro-optical modulator according to another embodiment of the present invention.

An electro-optical modulator according to another embodiment of the present invention will be described below with reference to FIG. 5. The embodiment shown in FIG. 5 is a modification of the embodiment shown in FIGS. 2 and 3. Those parts shown in FIG. 5 which correspond to those shown in FIGS. 2 and 3 are noted by identical reference characters, and will not be described in detail below.

In the embodiment shown in FIGS. 2 and 3, the electrodes 3, 4 and the groove electrodes 5, 6 deposited on the crystals 1, 2 are in plane symmetry with respect to the "c" axis of the crystals 1, 2. Stated otherwise, the direction extending from the groove electrode 5 toward the electrode 3 on the crystal 1 is the same as the direction of the "c" axis thereof, and the direction extending from the groove electrode 6 toward the electrode 4 on the crystal 2 is opposite to the direction of the "c" axis thereof.

In the embodiment shown in FIG. 5, however, the electrodes 3, 4 and the groove electrodes 5, 6 deposited on the crystals 1, 2 are in the positional relationship with respect to the "c" axis of the crystals 1, 2. Stated otherwise, the direction extending from the groove electrode 5 toward the electrode 3 on the crystal 1 is the same as the direction of the "c" axis thereof, and the direction extending from the groove electrode 6 toward the electrode 4 on the crystal 2 is the same as the direction of the "c" axis thereof. Consequently, the crystals 1, 2 may comprise crystals with electrodes deposited in the same manner, and hence offer a practical advantage. Where two crystals are employed, the electro-optical modulator shown in FIG. 5 is more inexpensive than the electro-optical modulator according to the embodiment shown in FIGS. 2 and 3. However, the signal source 9 is connected to the electrodes 3, 4 and 5, 6 in a manner different from the embodiment shown in FIGS. 2 and 3.

More specifically, a signal source (oscillator) 9 has a terminal connected to the groove electrode 5 of the crystal 1 and the electrode 4 of the crystal 2 and a terminal connected to the electrode 3 of the crystal 1 and the groove electrode 6 of the crystal 2 for applying a signal voltage to columnar portions having a size of 0.4 mm×0.4 mm×12 mm (the depth of the groove 8 is actually 0.5 mm, which is slightly greater than the dimension of 0.4 mm) in the direction of the "c" axis, the columnar portions serving as optical paths. The other structural details and operation of the electro-optical modulator shown in FIG. 5 are identical to those of the electro-optical modulator according to the embodiment shown in FIGS. 2 and 3.

Figure 6:
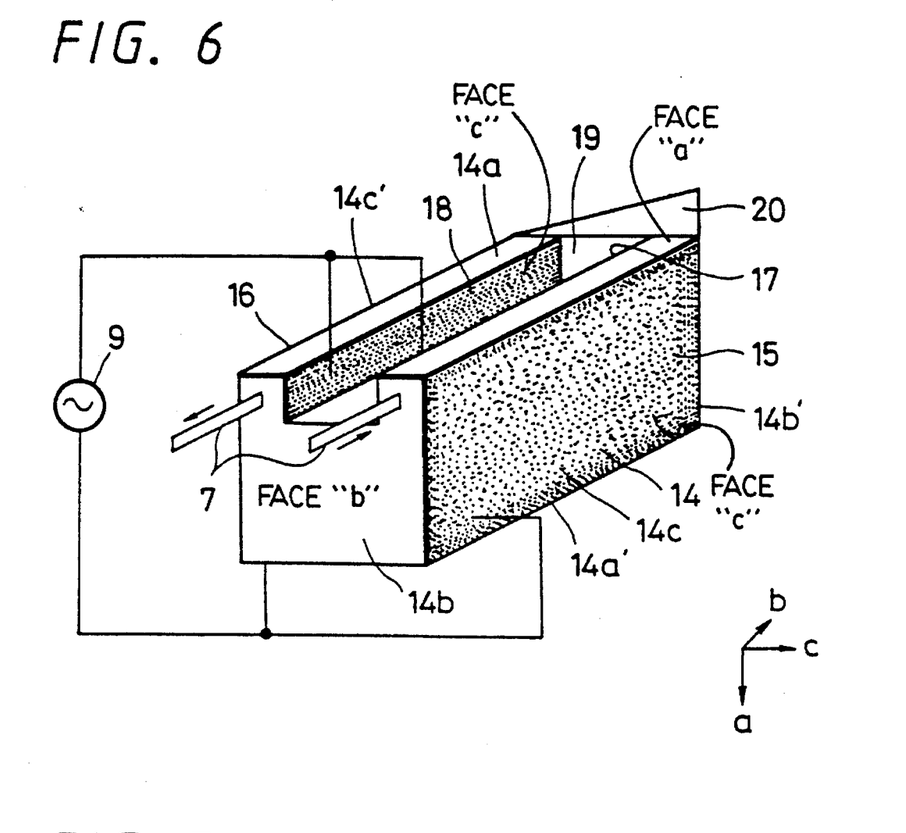
FIG. 6 is a perspective view of an electro-optical modulator according to still another embodiment of the present invention.

An electro-optical modulator according to still another embodiment of the present invention will be described below with reference to FIGS. 6 and 7. As shown in FIG. 6, the electro-optical modulator has an electro-optical crystal 14 of KTP (KTiOPO$_4$). Other nonlinear crystals which have similar crystal structure to KTP (ex. KTA=KTiOAsO$_4$, RTP=RbTiOPO$_4$, RTA=RbTiOAsO$_4$, CTA=CsTiOAsO$_4$) can be applied. These crystals show equivalent advantages to KTP. These advantages will be mentioned later (Page 28). The electro-optical crystal 14 may be made of LiTaO$_3$ or LiNbO$_3$, though they do not show these advantages. Here in this specification, KTP is referred to as an example. However, the electro-optical crystal 14 may be made of LiTaO$_4$ or LiNbO$_3$. The electro-optical crystal 14 is in the form of a rectangular parallelepiped cut in the directions of "a", "b", and "c" crystal axes. The electro-optical crystal 14 has parallel planes 14a, 14a' confronting each other, parallel planes 14b, 14b' confronting each other and extending perpendicularly to the planes 14a, 14a', and parallel planes 14c, 14c' confronting each other and extending perpendicularly to the planes 14a, 14a' and the planes 14b, 14b'. The parallel planes 14a, 14a' are of a face "a", the parallel planes 1b, 1b' are of a face "b", and the parallel planes 1c, 1c' are of a face "c".

The electro-optical crystal 14 has a length of 2 mm along the "a" axis, a length of 12 mm along the "b" axis, and a length of 2 mm along the "c" axis. The faces "b" 14b, 14b' of the electro-optical crystal 14 are polished to an optical grade, and coated with a nonreflective coating layer which does not reflect a laser beam used.

Electrodes 15, 16 are deposited respectively on the entire faces "c" 14c, 14c' of the electro-optical crystal 14 by evaporation. As shown in FIG. 7, a groove 19 is defined in the face "a" 14a of the electro-optical crystal 14 at a position spaced about 0.4 mm from a ridge where the face "a" 14a and the face "c" 14c intersect with each other, the groove 19 being in the shape of a rectangular parallelepiped having a width of 1.2 mm and a depth of 0.5 mm, for example, and having two side surfaces parallel to the face "c" 14c and a bottom surface parallel to the face "a" 14a'. Groove electrodes 17, 18 are then formed on the opposite side surfaces of the groove 19 by evaporation.

The groove electrodes 17, 18 may be formed on side surfaces of separate grooves in the electro-optical crystal 14 in confronting relation to the electrodes 15, 16, respectively.

A signal source (oscillator) 9 has a terminal connected to the electrodes 15, 16 of the crystal 14 and a terminal connected to the groove electrodes 17, 18 thereof for applying a signal voltage to a pair of columnar portions each having a size of 0.4 mm×0.4 mm×12 mm (the depth of the groove 8 is actually 0.5 mm, which is slightly greater than the dimension of 0.4 mm) in the direction of the "c" axis, the columnar portions serving as optical paths. The intensity of the electric fields between the electrodes 15, 16 and 17, 18 of the crystal 14 is very high to greatly reduce the halfwave voltage because the interelectrode distance is considerably small. If the interelectrode distance is 0.4 mm, then the halfwave voltage is 50V when the wavelength of an applied laser beam is 532 nm.

A reflecting prism 20 in the firm of a triangular prism having a cross-sectional shape of a rectangular equilateral triangle is disposed as a coupling optical element on the face "b" 14b' of the crystal 14. The prism 20 has a planar surface opposite to its right-angled ridge and which is bonded to the face "b" 14b' of the crystal 14 such that the prism 20 has two equilateral sides (planar sides) inclined 45° to the face "b" 14b' of the crystal 14 and its right-angled ridge is aligned with a bisector normal to the face "b" 14b' of the crystal 14. Reflecting films (described later on) are formed on the equilateral sides of the prism 20.

A polarized laser beam 7 which is collimated to a beam diameter of 80 μm and has a polarized direction (plane of polarization) at 45° with respect to the "a" and "c" axes of the crystal 14 is applied perpendicularly to a corner region of the face "b" 14b of the crystal 14. The collimated polarized laser beam 7 passes through one of the columnar portions of the crystal 14, and is emitted from a corner region of the face "b" 14b' of the crystal 14. The emitted laser beam is reflected twice 90° by the equilateral sides of the prism 20, so that the optical path of the laser beam 7 changes 180°. The laser beam 7 is then applied perpendicularly to another corner region of the face "b" 14b' of the crystal 14, passes through the other columnar portion of the crystal 14, and is emitted from another corner region of the face "b" 14b of the crystal 14. The emitted laser beam travels through a polarizer (analyzer), not shown, and is applied to a light detector, not shown.

The polarizer is positioned such that its direction of polarization (plane of polarization) extends perpendicularly to the polarized direction (plane of polarization) of the laser beam 7 that is applied to the face "b" 14b of the crystal 14. When a signal voltage from the signal source 9 is applied between the electrodes 15, 16 and 17, 18 of the crystal 14, the refractive index of the electro-optical crystal 14 is varied depending on the applied signal voltage, rotating the polarized direction (plane of polarization) of the laser beam 7. Since the laser beam 7 with its polarized direction (plane of polarization) rotated is applied through the polarizer to the light detector, the light detector produces a detected signal having a level commensurate with the signal voltage from the signal source 9.

The reflecting films on the equilateral sides of the prism 20 are of such a structure that the laser beam 7 emitted from a corner region of the face "b" 14b' of the crystal 14 and applied to the prism 20 and the laser beam emitted from the prism 20 and applied to another corner region of the face "b" 14b' of the crystal 14 remain unchanged in their polarized condition, but have switched ordinary and extraordinary rays, i.e., have opposite directions of rotation of the polarization, i.e., if the direction of rotation of the polarization of the laser beam 7 emitted from a corner region of the face "b" 14b' of the crystal 14 and applied to the prism 20 is left-handed (or right-handed), then the direction of rotation of the polarization of the laser beam emitted from the prism 20 and applied to another corner region of the face "b" 14b' of the crystal 14 is right-handed (or left-handed).

With only one electro-optical crystal 14 being used, when the laser beam 7 is applied to and reflected twice 90° by the prism 20, the laser beam having passed through the prism 20 is shifted in phase by 180°, and the ordinary and extraordinary rays are switched. Consequently, natural birefringence is removed and an output laser beam intensity is prevented from being varied by temperature fluctuations.

An electro-optical modulator according to yet another embodiment of the present invention will be described below with reference to FIG. 8. The embodiment shown in FIG. 8 is a modification of the embodiment shown in FIG. 6 and 7. In the embodiment shown in FIG. 8, the reflecting prism 20 shown in FIG. 6 is replaced by a pair of mirrors (plane mirrors) 22B, 22A disposed as a coupling optical element on the face "b" 14b' of the crystal 14, the mirrors 22B, 22A having respective reflecting surfaces lying 90° with respect to each other. The mirrors 22B, 22A are positioned such that they are inclined at 45° to the face "b" 14b' of the crystal 14 and have their right-angled ridge aligned with a bisector normal to the face "b" 14b' of the crystal 14. The other structural details and operation of the electro-optical modulator shown in FIG. 8 are identical to those of the electro-optical modulator according to the embodiment shown in FIGS. 5 and 6, and will not be described in detail below.

In the embodiment shown in FIG. 8, the mirrors 22B, 22A have respective reflecting films which are of such a structure that the laser beam 7 emitted from a corner region of the face "b" 14b' of the crystal 14 and applied to the mirror 22B and the laser beam reflected from the mirror 22A and applied to another corner region of the face "b" 14b' of the crystal 14 remain unchanged in their polarized condition, but have switched ordinary and extraordinary rays, i.e., have opposite directions of rotation of the polarization, i.e., if the direction of rotation of the polarization of the laser beam 7 emitted from a corner region of the face "b" 14b' of the crystal 14 and applied to the mirror 22B is left-handed (or right-handed), then the direction of rotation of the polarization of the laser beam reflected from the mirror 22A and applied to another corner region of the face "b" 14b' of the crystal 14 is right-handed (or left-handed).

Therefore, with only one electro-optical crystal 14 being used, when the laser beam 7 is applied to and reflected twice 90° by the mirrors 22B, 22A, the laser beam is shifted in phase by 180°, and the ordinary and extraordinary rays are switched. Consequently, natural birefringence is removed and an output laser beam intensity is prevented from being varied by temperature fluctuations.

Figure 7:
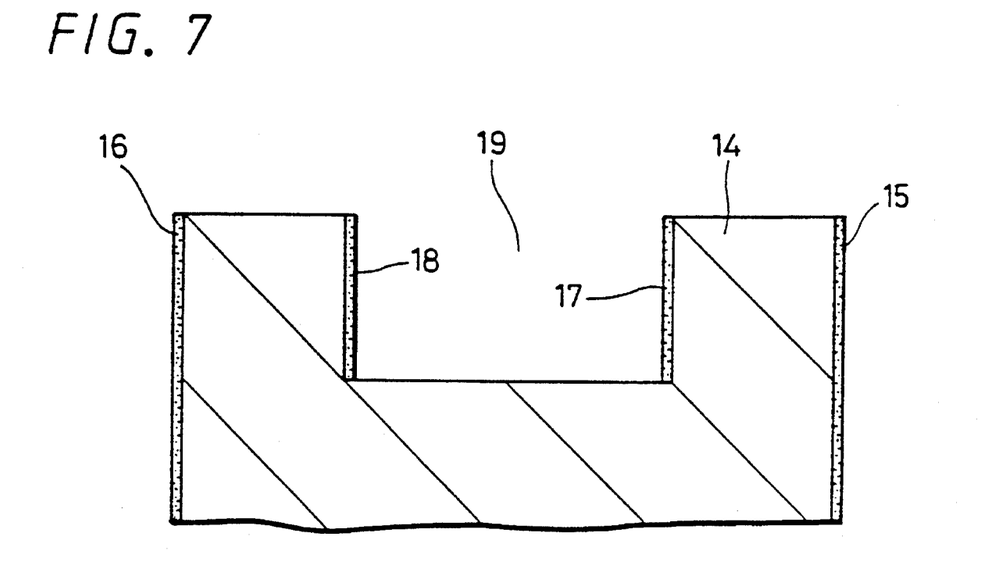
FIG. 7 is a fragmentary transverse crosssectional view of a KTP crystal of the electro-optical modulator shown in FIG. 6.
Figure 8:
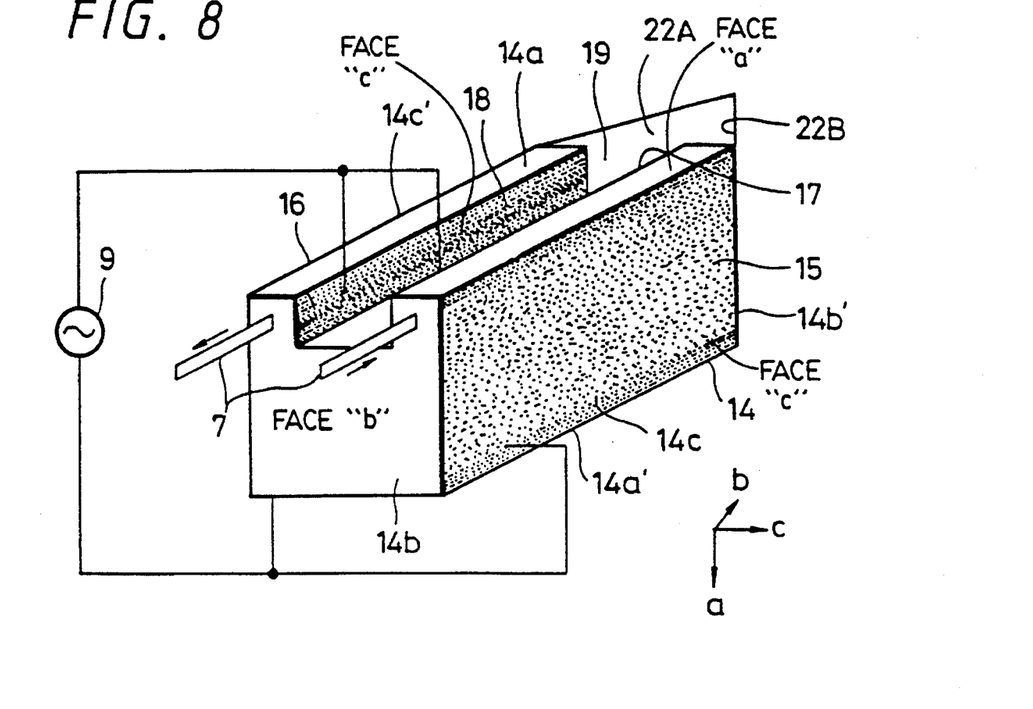
FIG. 8 is a perspective view of an electro-optical modulator according to yet another embodiment of the present invention.

The electro-optical modulator shown in FIG. 8 is somewhat more inconvenient to handle than the electro-optical modulator shown in FIGS. 6 and 7 because it requires two mirrors 22B, 22A rather than the single reflecting prism 20. However, it is possible to adjust the mirrors 22B, 22A so that the angle between their reflecting surfaces will be 90°. Since such angle adjustment cannot be made by the prism 20, the prism 20 is required to be manufactured with its reflecting surfaces lying at 90° with respect to each other.

Figure 9:
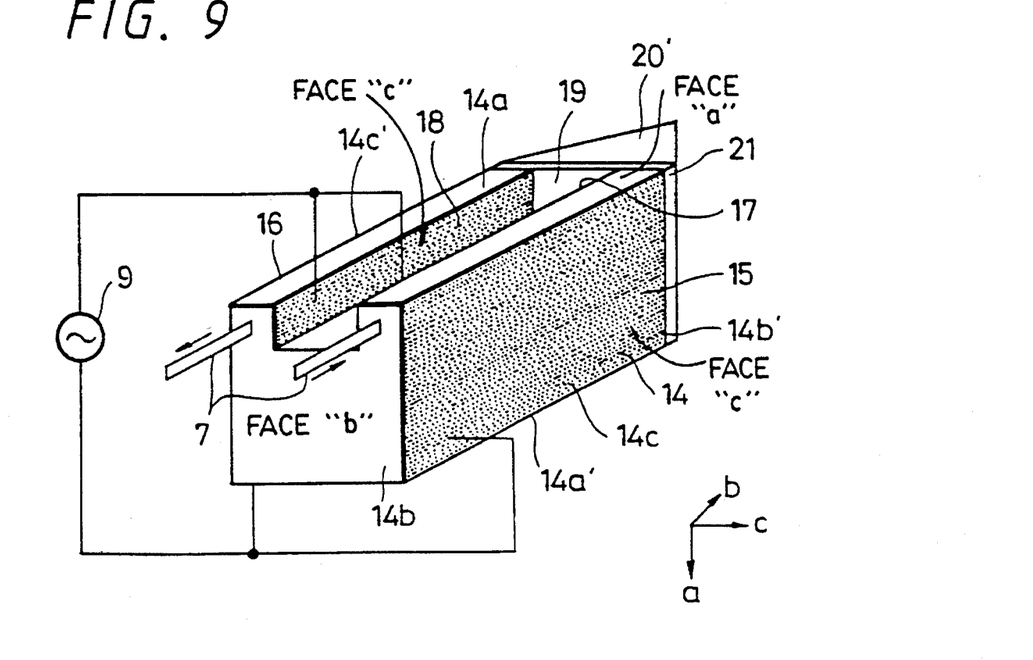
FIG. 9 is a perspective view of an electro-optical modulator according to a still further embodiment of the present invention.

FIG. 9 shows an electro-optical modulator according to a still further embodiment of the present invention. The embodiment shown in FIG. 9 is also a modification of the embodiment shown in FIG. 6 and 7. Those parts shown in FIG. 9 which correspond to those shown in FIGS. 6 and 7 are noted by identical reference characters, and will not be described in detail below.

In this embodiment, a quarter-wave plate (phase plate or birefringent plate) 21 which is oriented at a suitable angle is disposed between the face "b" 14b' of the electro-optical prism 14b' and a reflecting prism 20' in the firm of a triangular prism having a cross-sectional shape of a rectangular equilateral triangle (which is essentially the same as the reflecting prism 20 shown in FIG. 6). The reflecting films on the equilateral sides of the prism 20' are of such a structure that, with no quarter-wave plate 21 provided, the laser beam 7 emitted from a corner region of the face "b" 14b' of the crystal 14 and applied to the prism 20' and the laser beam emitted from the prism 20' and applied to another corner region of the face "b" 14b' of the crystal 14 remain unchanged in their polarized condition and have no phase difference therebetween.

A polarized laser beam 7 which is collimated to a beam diameter of 80 μm and has a polarized direction (plane of polarization) at 45° with respect to the "a" and "c" axes of the crystal 14 is applied perpendicularly to a corner region of the face "b" 14b of the crystal 14. The collimated polarized laser beam 7 passes through one of the columnar portions of the crystal 14, and is emitted from a corner region of the face "b" 14b' of the crystal 14. The emitted laser beam passes through the quarter-wave plate 21 and is reflected twice 90° by the equilateral sides of the prism 20', so that the optical path of the laser beam 7 changes 180°. The laser beam 7 then passes through the quarter-wave plate 21, is applied perpendicularly to another corner region of the face "b" 14b' of the crystal 14, passes through the other columnar portion of the crystal 14, and is emitted from another corner region of the face "b" 14b of the crystal 14. The emitted laser beam travels through a polarizer (analyzer), not shown, and is applied to a light detector, not shown.

The polarizer is positioned such that its direction of polarization (plane of polarization) extends perpendicularly to the polarized direction (plane of polarization) of the laser beam 7 that is applied to the face "b" 14b of the crystal 14. When a signal voltage from the signal source 9 is applied between the electrodes 15, 16 and 17, 18 of the crystal 14, the refractive index of the electro-optical crystal 14 is varied depending on the applied signal voltage, rotating the polarized direction (plane of polarization) of the laser beam 7. Since the laser beam 7 with its polarized direction (plane of polarization) rotated is applied through the polarizer to the light detector, the light detector produces a detected signal having a level commensurate with the signal voltage from the signal source 9.

The laser beam 7 emitted from a corner region of the face "b" 14b' of the crystal 14 and about to be applied to the quarter-wave plate 21, and the laser beam having passed through the quarter-wave plate 21 and about to be applied to another corner region of the face "b" 14b' of the crystal 14 are shifted in phase by 180° upon passage twice through the quarter-wave plate 21, and remain unchanged in the polarized condition, but have switched ordinary and extraordinary rays, i.e., have opposite directions of rotation of the polarization, i.e., if the direction of rotation of the polarization of the laser beam 7 emitted from a corner region of the face "b" 14b' of the crystal 14 and about to be applied to the quarter-wave plate 21 is left-handed (or right-handed), then the direction of rotation of the polarization of the laser beam emitted from the quarter-wave plate 21 and applied to another corner region of the face "b" 14b' of the crystal 14 is right-handed (or left-handed).

Therefore, with only one electro-optical crystal 14 being used, when the laser beam 7 passes through the quarter-wave plate 21 twice, the laser beam having passed through the prism 20' is shifted in phase by 180°, and the ordinary and extraordinary rays are switched. Consequently, natural birefringence is removed and an output laser beam intensity is prevented from being varied by temperature fluctuations.

In FIG. 9, the reflecting films on the equilateral sides of the reflecting prism 20' may be of such a structure that the reflecting film 20' will have a function to shift the phase of the laser beam by a certain quantity, and the quantity by which the laser beam is shifted in phase by the quarter-wave plate 21 may be set to a given value, so that when the laser beam 7 passes through the quarter-wave plate 21 twice and is reflected twice 90° by the prism 20', the laser beam 7 emitted from a corner region of the face "b" 14b' of the crystal 14 and about to be applied to the quarter-wave plate 21, and the laser beam having passed through the quarter-wave plate 21 and about to be applied to another corner region of the face "b" 14b' of the crystal 14 have switched ordinary and extraordinary rays, i.e., have opposite directions of rotation of the polarization, i.e., if the direction of rotation of the polarization of the laser beam 7 emitted from a corner region of the face "b" 14b' of the crystal 14 and about to be applied to the quarter-wave plate 21 is left-handed (or right-handed), then the direction of rotation of the polarization of the laser beam emitted from the quarter-wave plate 21 and applied to another corner region of the face "b" 14b' of the crystal 14 is right-handed (or left-handed).

The advantages offered by the electro-optical modulators according to the various embodiments shown in FIGS. 2 through 9 will be described below.

(1) Reduction of the half-wave voltage:

In order to lower the half-wave voltage, it is generally necessary to shorten the interelectrode distance. It is difficult to produce a very thin crystal using ordinary grinding and cutting processes for ordinary electro-optical crystals. According to the embodiments shown in FIGS. 2 and 3, FIG. 4, FIGS. 5 and 6, FIG. 7, and FIG. 8, however, at least one of a pair of electrodes disposed in sandwiching relation to an optical path of an electro-optical crystal is formed on a side surface of a groove defined in the electro-optical crystal along the optical path. Therefore, a short interelectrode distance is realized, resulting in a reduced half-wave voltage.

(2) Durability against optical damage:

According to the embodiments shown in FIGS. 2 and 3, FIG. 4, FIGS. 5 and 6, FIG. 7, and FIG. 8, if an electro-optical crystal of an electro-optical modulator is made of KTP, KTA, RTP, RTA or CTA, then when the laser beam 7 used has a wavelength of 532 nm, the optical density at which these crystals suffer optical damage is 100 kW/cm² or greater, and hence the electro-optical modulator is highly durable against optical damage.

(3) Improved extinction ratio:

According to the x FIGS. 5 and 6, FIG. 7, and FIG. 8, if an electro-optical crystal of an electro-optical modulator is made of KTP, KTA, RTP, RTA or CTA, then since the electro-optical modulator is highly durable against optical damage, the beam diameter of a laser beam applied to the electro-optical crystal can be reduced, and the volume of the optical path in the electro-optical crystal is also reduced. Therefore, the refractive index uniformity in the operating volume of the electro-optical effect is relatively increased, thereby improving the extinction ratio. For example, if the laser beam of 50 mW which is of an optical intensity required to optical record data is narrowed to a beam diameter of 80 μm, then the optical density is 1 kW/cm², resulting in a sufficiently small threshold for the generation of optical damage. In this case, an extinction ratio of 100:1 is observed, which is of a considerable improvement over the extinction ratio of 50:1 of a conventional commercially available electro-optical modulator which is made of LiTaO₃.

Figure 4:
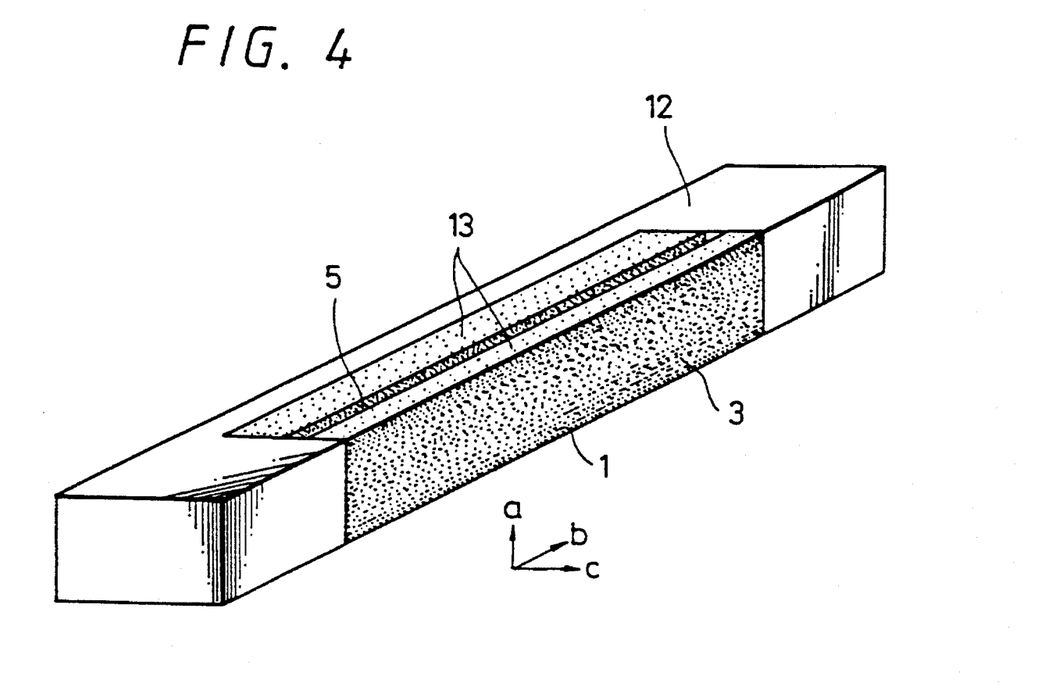
FIG. 4 is a perspective view illustrative of a process of manufacturing the KTP crystal.

(4) Removal of natural birefringence and prevention of an output laser beam intensity from being varied by temperature fluctuations:

According to the embodiments shown in FIGS. 2 and 3 and FIG. 4, the electro-optical crystal comprises a pair of electro-optical crystals in which the electrodes are disposed along the optical path such that planes of the electrodes lie perpendicularly to each other. With this arrangement, natural birefringence is removed and an output laser beam intensity is prevented from being varied by temperature fluctuations. According to the embodiments shown in FIGS. 6 and 7 and FIG. 8, the prism or the prism and the quarter-wave plate produce an optical phase difference of a half wavelength to switch ordinary and extraordinary rays. Therefore, even if two electro-optical crystals are not provided as with the embodiments shown in FIGS. 2 and 3 and FIG. 4, natural birefringence is removed and an output laser beam intensity is prevented from being varied by temperature fluctuations, with only one electro-optical crystal. According to the embodiment shown in FIG. 9, the coupling optical element for coupling a pair of optical paths comprises a prism and the optical element for switching ordinary and extraordinary rays comprises a quarter-wave plate. Consequently, the electro-optical modulator can be designed and manufactured easily.

The present invention is not limited to the above specific embodiments, but may be modified in various ways. For example, if the electro-optical crystal has a length of 12 mm, then the interelectrode distance can be reduced to 0.24 mm, and the half-wave voltage may be set to about 27V for such interelectrode distance. There is a limitation on further reduction of the interelectrode distance because of the diffraction of a laser beam. In an electro-optical modulator which has a pair of electrodes disposed one on each side of an optical path of an electro-optical crystal, and in which a signal voltage is applied between the electrodes, the electrodes may be formed respectively on side surfaces of grooves defined along the optical path. Such grooves may be defined within the electro-optical crystal.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An electro-optical modulator comprising:

an electro-optical crystal having an optical path; and a pair of electrodes disposed one on each side of said optical path for applying a signal voltage therebetween;

at least one of said electrodes being formed on a side surface of a groove defined along the optical path of said electro-optical crystal.

2. An electro-optical modulator according to claim 1, wherein said electro-optical crystal comprises a pair of electro-optical crystals in which said electrodes are disposed along said optical path such that planes of the electrodes lie perpendicularly to each other.

3. An electro-optical modulator comprising:

an electro-optical crystal having a pair of optical paths;

a pair of electrodes disposed one on each side of each of said optical paths for applying a signal voltage therebetween;

at least one of said electrodes being formed on a side surface of a groove defined along the optical paths of said electro-optical crystal; and a coupling optical element disposed on an end surface of said electro-optical crystal and connecting said optical paths to each other.

4. An electro-optical modulator according to claim 3, wherein said coupling optical element comprises an optical element for giving an optical phase difference of a half wavelength to switch ordinary and extraordinary rays.

5. An electro-optical modulator according to claim 4, wherein said coupling optical element comprises a reflecting prism or a pair of mirrors.

6. An electro-optical modulator according to claim 4, wherein said coupling optical element comprises a reflecting prism and a wave plate disposed between said electro-optical crystal and said reflecting prism.

7. An electro-optical modulator according to claim 4, wherein said coupling optical element comprises a reflecting prism for keeping applied and emitted radiations unchanged in their polarized condition and keeping the applied and emitted radiations in phase with each other, and a quarter-wave plate disposed between said electrooptical crystal and said reflecting prism.

8. An electro-optical modulator according to claim 1, wherein said electro-optical crystal is $KTiOPO_4$, $KTiOAsO_4$, $RbTiOPO_4$, $RbTiOAsO_4$ or $CsTiOAsO_4$.

* * * * *